US012167438B2

(12) United States Patent
Yang et al.

(10) Patent No.: US 12,167,438 B2
(45) Date of Patent: Dec. 10, 2024

(54) SYSTEMS AND METHODS FOR RADIO ACCESS NETWORK-LEVEL ALLOCATION AND RETENTION PRIORITY BASED ON NETWORK SLICING

(71) Applicant: Verizon Patent and Licensing Inc., Basking Ridge, NJ (US)

(72) Inventors: Jin Yang, Orinda, CA (US); Yuexin Dong, Bridgewater, NJ (US); Frank Jager, Chester, NJ (US); Kristen Sydney Young, Mine Hill, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 330 days.

(21) Appl. No.: 17/659,101

(22) Filed: Apr. 13, 2022

(65) Prior Publication Data

US 2022/0248412 A1 Aug. 4, 2022

Related U.S. Application Data

(63) Continuation of application No. 16/988,566, filed on Aug. 7, 2020, now Pat. No. 11,330,605.

(51) Int. Cl.
*H04W 72/56* (2023.01)
*H04W 28/02* (2009.01)
(Continued)

(52) U.S. Cl.
CPC ....... *H04W 72/56* (2023.01); *H04W 28/0268* (2013.01); *H04W 28/10* (2013.01);
(Continued)

(58) Field of Classification Search
CPC . H04W 72/56; H04W 72/54; H04W 28/0268; H04W 28/10; H04W 64/003
See application file for complete search history.

(56) References Cited

U.S. PATENT DOCUMENTS

| 2020/0336937 | A1  | 10/2020 | Youn et al. |
| 2020/0374900 | A1* | 11/2020 | Aksu .................. H04W 72/535 |
| 2023/0042545 | A1* | 2/2023  | Palaios ............. H04W 28/0268 |

FOREIGN PATENT DOCUMENTS

CN 110691382 1/2020

OTHER PUBLICATIONS

"5G; Procedures for the 5G System (5GS) (3GPP TS 23.502 version 15.5.1 Release 15", ETSI TS 123 502 V15.5.1 (May 2019), May 2019 (available at https://www.etsi.org/deliver/etsi_ts/123500_123599/123502/15.05.01_60/ts_123502v150501p.pdf, visited Aug. 3, 2020).

(Continued)

*Primary Examiner* — Myron Wyche

(57) ABSTRACT

A system described herein may provide a technique for allocation and/or preemption of radio access network ("RAN") resources in a wireless network based on Quality of Service ("QoS")-related metrics associated with User Equipment ("UEs") that are connected to, and/or are requesting connection to, a RAN. QoS-related metrics may include a network slice, a QoS Flow Identifier ("QFI"), other suitable metrics. A Slice-Based Priority ("SBP") determine one or more priority (e.g., SBP) values for UEs connected to the one or more RANs, and/or for UEs requesting connection to such RANs. In addition to QoS-related metrics priority values may be determined based on RAN-related metrics, such as Allocation and Retention Priority ("ARP") values associated with a UE. RANs may accordingly be able to allocate resources, accept or deny connection requests, and/or perform preemption based at least partly on slice-related QoS metrics, thus preserving end-to-end QoS parameters.

20 Claims, 11 Drawing Sheets

(51) Int. Cl.
*H04W 28/10* (2009.01)
*H04W 48/02* (2009.01)
*H04W 64/00* (2009.01)
*H04W 72/54* (2023.01)

(52) U.S. Cl.
CPC ......... *H04W 48/02* (2013.01); *H04W 64/003* (2013.01); *H04W 72/54* (2023.01)

(56) References Cited

OTHER PUBLICATIONS

"Network Slice Selection Function (NSSF) Cloud Native User's Guide", Oracle Communications, Release 1.0, Apr. 2019 (available at https://docs.oracle.com/cd/F17999_01/docs.10/NSSF.pdf, visited Aug. 3, 2020).

* cited by examiner

SYSTEMS AND METHODS FOR RADIO ACCESS NETWORK-LEVEL ALLOCATION AND RETENTION PRIORITY BASED ON NETWORK SLICING

CROSS-REFERENCE TO RELATED APPLICATION

This application is a Continuation of U.S. patent application Ser. No. 16/988,566, filed on Aug. 7, 2020, titled "SYSTEMS AND METHODS FOR RADIO ACCESS NETWORK-LEVEL ALLOCATION AND RETENTION PRIORITY BASED ON NETWORK SLICING," the contents of which are herein incorporated by reference in their entirety.

BACKGROUND

Wireless networks, such as Fifth Generation ("5G") wireless networks, may utilize various techniques for ensuring Quality of Service ("QoS") treatment for traffic associated with user equipment ("UEs"), such as mobile telephones that are connected to such wireless networks. For example, a 5G core ("5GC") may be implemented via multiple instances or "slices," where different slices implement the same or similar network functions but provide differing levels of service. A radio access network ("RAN") that is communicatively coupled to a core network may use allocation and retention ("ARP") techniques to accept or reject incoming connection requests for UEs in situations where the RAN has limited resources.

DETAILED DESCRIPTION OF THE PREFERRED EMBODIMENTS

The following detailed description refers to the accompanying drawings. The same reference numbers in different drawings may identify the same or similar elements.

Embodiments described herein provide for allocation and/or preemption of RAN resources based on QoS-related metrics associated with UEs that are connected to, and/or are requesting connection to, a RAN. For example, in some embodiments, the QoS-related metrics may include a network slice (e.g., as indicated by a Network Slice Selection Assistance Information ("NSSAI"), a Single-NSSAI ("S-NSSAI"), or the like) associated with a UE, a QoS Flow Identifier ("QFI") associated with one or more QoS flows associated with the UE, a Slice/Service Type ("SST") associated with the UE, and/or other suitable metrics. For example, in accordance with some embodiments, a SBP component may be communicatively coupled to one or more base stations (e.g., Next Generation Node Bs ("gNBs")) of one or more RANs (e.g., one or more 5G RANs), and may determine one or more SBP values for UEs connected to the one or more RANs, and/or for UEs requesting connection to such RANs.

As discussed below, the SBP values may be determined based on slice-related QoS metrics associated with such UEs (e.g., NSSAI, QFI, SST, etc.). Additionally, or alternatively, SBP values may be determined based on RAN-related QoS or priority metrics or parameters, such as Allocation and Retention Priority ("ARP") values. In accordance with embodiments described herein, RANs may accordingly be able to allocate resources, accept or deny connection requests, and/or perform preemption (e.g., disconnect connected UEs) based at least partly on slice-related QoS metrics. In this manner, end-to-end QoS parameters may be better preserved and may be less complex to implement than implementations that perform such resource allocation and/or preemption based solely on RAN-level parameters, such as ARP alone.

Figure 1:
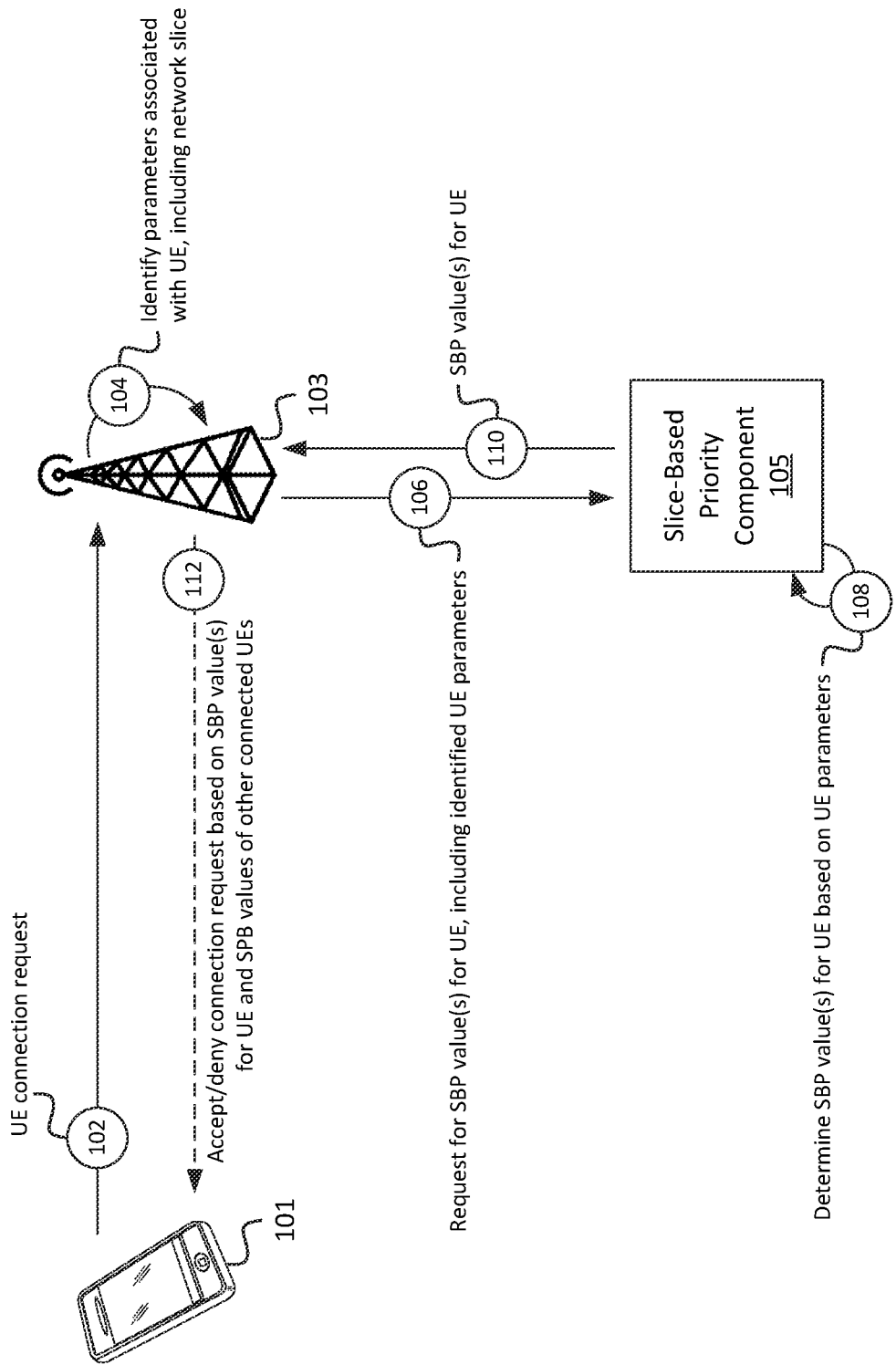
FIG. 1 illustrates an example of a base station of a RAN determining a Slice-Based Priority value associated with a UE and accepting or denying a connection request for the UE based on the SBP value, in accordance with some embodiments.

For example, as shown in FIG. 1, UE 101 may output (at 102) a connection request to base station 103. The connection request may include identifying information for the UE (e.g., an International Mobile Subscriber Identity ("WISE) value, an International Mobile Station Equipment Identity ("WEI") value, and/or other suitable identifying information), a requested service type (e.g., voice, data, emergency call, and/or some other type of service), and/or other suitable information.

Base station 103 may identify (at 104) parameters associated with UE 101, which may include identifying QoS parameters associated with UE 101 and/or the requested service type. For example, different UEs 101 may be associated with different QoS parameters (e.g., a first responder or emergency type of UE 101 may be associated with a relatively higher set of QoS parameters than another type of UE 101), and/or different service types may be associated with different QoS parameters (e.g., an emergency voice call may be associated with a relatively higher set of QoS parameters than a non-emergency voice call or a data connection).

In some embodiments, base station 103 may identify a particular network slice associated with UE 101 and/or the requested service type. For example, a first network slice may be associated with emergency voice calls and/or a particular set of UE subscriber types (e.g., first responder or emergency UEs 101), a second network slice may be associated with non-emergency voice calls and/or another set of UE subscriber types (e.g., enterprise or priority UEs 101), a third network slice may be associated with Guaranteed Bit Rate ("GBR") data services, a fourth network slice may be associated with non-GBR data services, and so on.

In some embodiments, base station 103 may identify an ARP associated with UE 101 and/or the requested service type. For example, a given service type for a first UE 101 may be associated with a first ARP value, while the same service type for a second UE 101 may be associated with a second ARP value. As another example, a first service type for a given UE 101 may be associated with one ARP value, while a second service type for the same UE 101 may be associated with a different ARP value.

In some embodiments, base station 103 may identify one or more other types of parameters associated with UE 101 and/or base station 103, such as a geographic location of UE 101, a Tracking Area Identifier ("TAI") associated with UE 101 and/or base station 103, a Public Land Mobile Network identifier ("PLMN ID") associated with UE 101 and/or base station 103, and/or other parameters associated with UE and/or base station 103.

For the sake of brevity, unless otherwise noted, the examples provided herein are in the context of given UEs 101 each being associated with a single set of QoS parameters (e.g., a single QoS flow, a single service type, a single ARP value, etc.). In practice, similar concepts may apply in situations where a given UE 101 is associated with multiple QoS flows, multiple service types, multiple ARP values, etc. For example, in examples where a given UE 101 is described as being disconnected from base station 103, such disconnection may be a disconnection of one QoS flow associated with UE 101, while one or more other QoS flows associated with UE 101 may not be disconnected.

Returning to FIG. 1, base station 103 may output (at 106) a request to SBP component 105, for one or more SBP values associated with UE 101. In some embodiments, base station 103 may be communicatively coupled to SBP component 105 via an application programming interface ("API") or some other suitable communication pathway. In some embodiments, the same device or system that implements some or all of the functionality of base station 103 may implement some or all of the functionality of SBP component 105. In some embodiments, SBP component 105 may be communicatively coupled to multiple base stations 103. The request (at 106) for SBP values may include some or all of the parameters (identified at 104) associated with UE 101, including the requested service type, the associated network slice, an identifier of UE 101, the ARP value associated with UE 101, etc.

SBP component 105 may determine (at 108) an SBP value associated with UE 101 based on the received parameters. For example, SBP component 105 may maintain one or more models, mappings, etc. that may be used to correlate the received parameters to a particular SBP. Additionally, or alternatively, SBP component 105 may perform one or more suitable functions to calculate an SBP for UE 101 based on the received parameters. In some embodiments, as discussed below, the SBP component 105 may use machine learning, artificial intelligence ("AI"), and/or one or more other suitable techniques to generate and/or refine the models, mappings, functions, etc. based on which SBP component 105 determines the SBP value for UE 101.

SBP component 105 may provide (at 110) the SBP value for UE 101 to base station 103. As discussed below, base station 103 may use (at 112) the SBP value to determine whether to accept or deny the connection request for UE 101. For example, as discussed below, base station 103 may compare the SBP value to SBP values of other UEs 101 connected to, or within communication range of, base station 103. In some embodiments, base station 103 may only deny incoming connection requests (e.g., using SBP values) in situations where base station 103 is congested, overloaded, or the like (e.g., where available physical radio frequency ("RF") resources of base station 103 are below a threshold level), and may otherwise accept incoming connection requests regardless of SBP values. In some embodiments, base station 103 may accept or deny incoming connection requests based on SBP values of UEs 101 from which such connection requests are received and one or more other criteria in addition to, or in lieu of, SBP values of other connected UEs 101. For example, if the SBP value of a particular UE 101 from which a connection request is received is below a threshold SBP value and the request is received at a time of day that base station 103 has historically exhibited or experienced congestion, base station 103 may deny the connection request.

Figure 2:
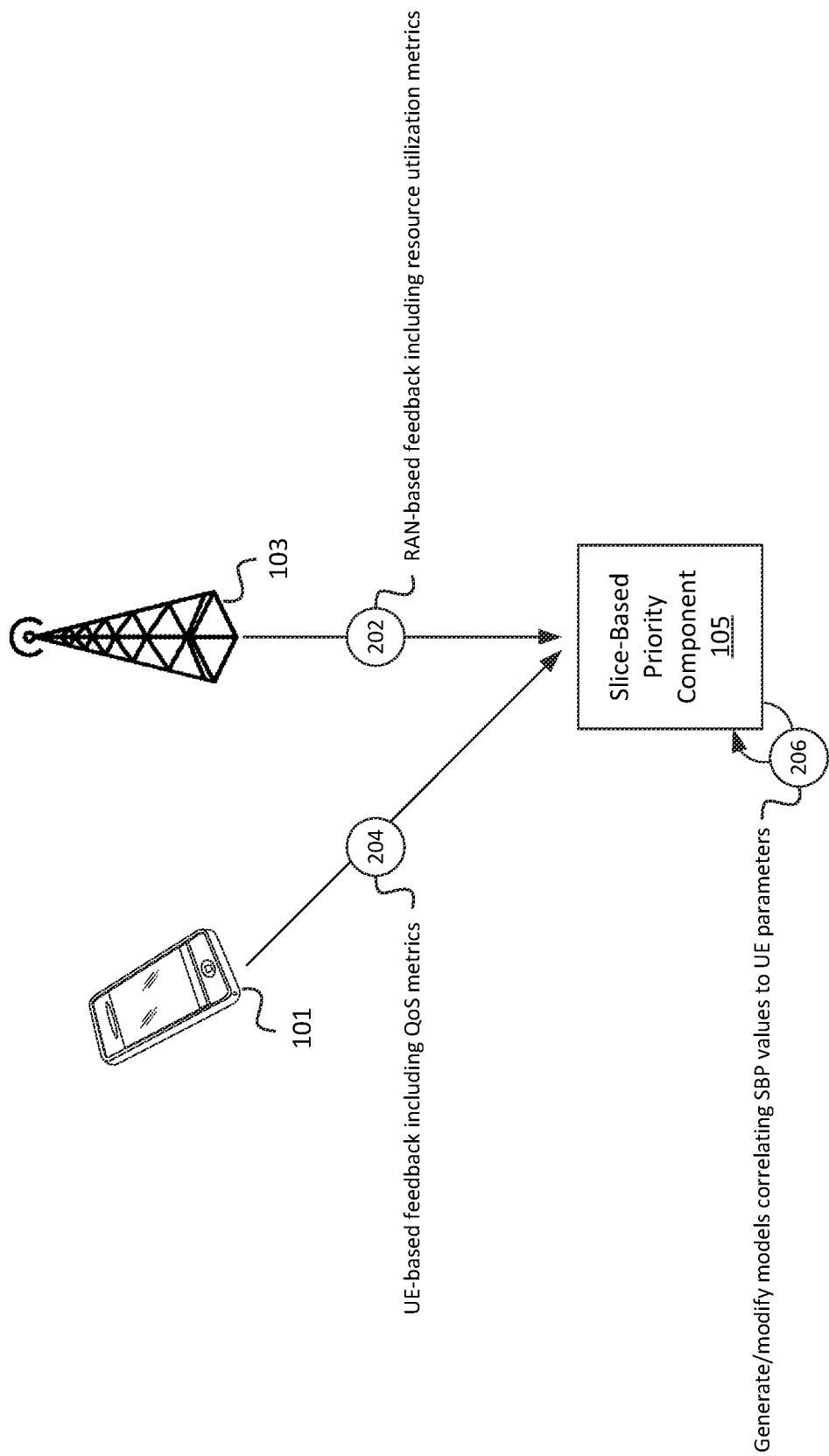
FIG. 2 illustrates an example of using machine learning techniques to generate and/or refine a model based on which SBP values may be identified for UEs.

As noted above, and as shown in FIG. 2, SBP component 105 may use machine learning, AI, and/or other suitable techniques to generate and/or refine a model, mapping, etc., based on which SBP values may be identified for UEs 101. For example, SBP component 105 may receive (at 202) RAN-based feedback from base station 103 and/or some other device or system (e.g., one or more Access and Mobility Management Functions ("AMFs"), a Network Exposure Function ("NEF"), and/or some other suitable device or system). The RAN-based feedback may include metrics such as resource utilization associated with base station 103 (e.g., a percentage or proportion of utilized Physical Resource Blocks ("PRBs") compared to unutilized PRBs), an indication of load and/or congestion of RF resources associated with base station 103, and/or other metrics associated with resources of base station 103. In some embodiments, base station 103 may provide (at 202) the feedback information to SBP component 105 on an ongoing basis, such as a periodic and/or intermittent basis. In some embodiments, base station 103 may provide the feedback information in real time or in near-real time. In some embodiments, base station 103 may provide the feedback information based on the occurrence of one or more triggering events (e.g., after disconnecting a particular UE 101, after accepting a connection request from a particular UE 101, and/or other triggering events).

In some embodiments, SBP component 105 may receive (at 204) UE-based feedback from UE 101. For example, UE 101 may implement an API via which UE 101 may communicate with SBP component 105. Additionally, or alternatively, UE 101 may communicate with one or more other devices or systems (e.g., an application server that provides requested services to UE 101) that may provide such feedback information to SBP component 105.

In some embodiments, the feedback from UE 101 may include QoS-related metrics, such as latency, jitter, throughput, or other suitable metrics. In some embodiments, the feedback from UE 101 may include feedback from a user of UE 101. For example, UE 101 and/or the user of UE 101 may be presented with a survey requesting satisfaction with the performance of UE 101. Feedback based on such a survey may include a score (e.g., on a scale of 1-100 or some other suitable scale), a star rating (e.g., 1 through 5 stars), one or more keywords (e.g., "good," "bad," "slow," etc.), and/or other types of suitable feedback.

SBP component 105 may accordingly generate and/or modify (at 206) one or more models, mappings, functions, etc. that are used to correlate SBP values (e.g., as determined at 108) to UE parameters (e.g., as received at 106). For example, SBP component 105 may use machine learning, AI, and/or some other suitable technique to iteratively refine such models, mappings, functions, etc. in order to improve, or balance the improvement of, RAN-based metrics (e.g., as received at 202) and UE-based metrics (e.g., as received at 204).

In some embodiments, the modification of the models, mappings, functions, etc. may be performed to cause the RAN-based metrics and/or UE-based metrics more closely match expected or threshold values. For example, if a given QoS flow for a particular UE 101 should be associated with a particular minimum latency, and the UE-based feedback (received at 204) indicates that the particular minimum latency is not met, SBP component 105 may modify (at 206) a model, mapping, function, etc. to increase (e.g., in embodiments where an "increased" SBP indicates a higher priority level) the SBP value that is determined based on the particular set of parameters associated with the particular UE 101.

As another example, if the threshold resource utilization of base station 103 is 85% (e.g., where at least 85% of allocated PRBs are used for user plane traffic) and a current model, mapping, function, etc. yields 70% resource utilization, SBP component 105 may increase SBP values of UEs 101 that are associated with relatively lower SBP values and/or may decrease SBP values of UEs 101 that are associated with relatively higher values. Such modification of the SBP values (e.g., modification of the models, mappings, functions, etc. based on which the SBP values are determined) may accordingly affect the resource utilization of base station 103. SBP component 105 may commit or proceed with changes to the models, mappings, functions, etc. that increase the resource utilization of base station 103, and may discard changes that reduce or do not affect the resource utilization of base station 103.

Figure 3:
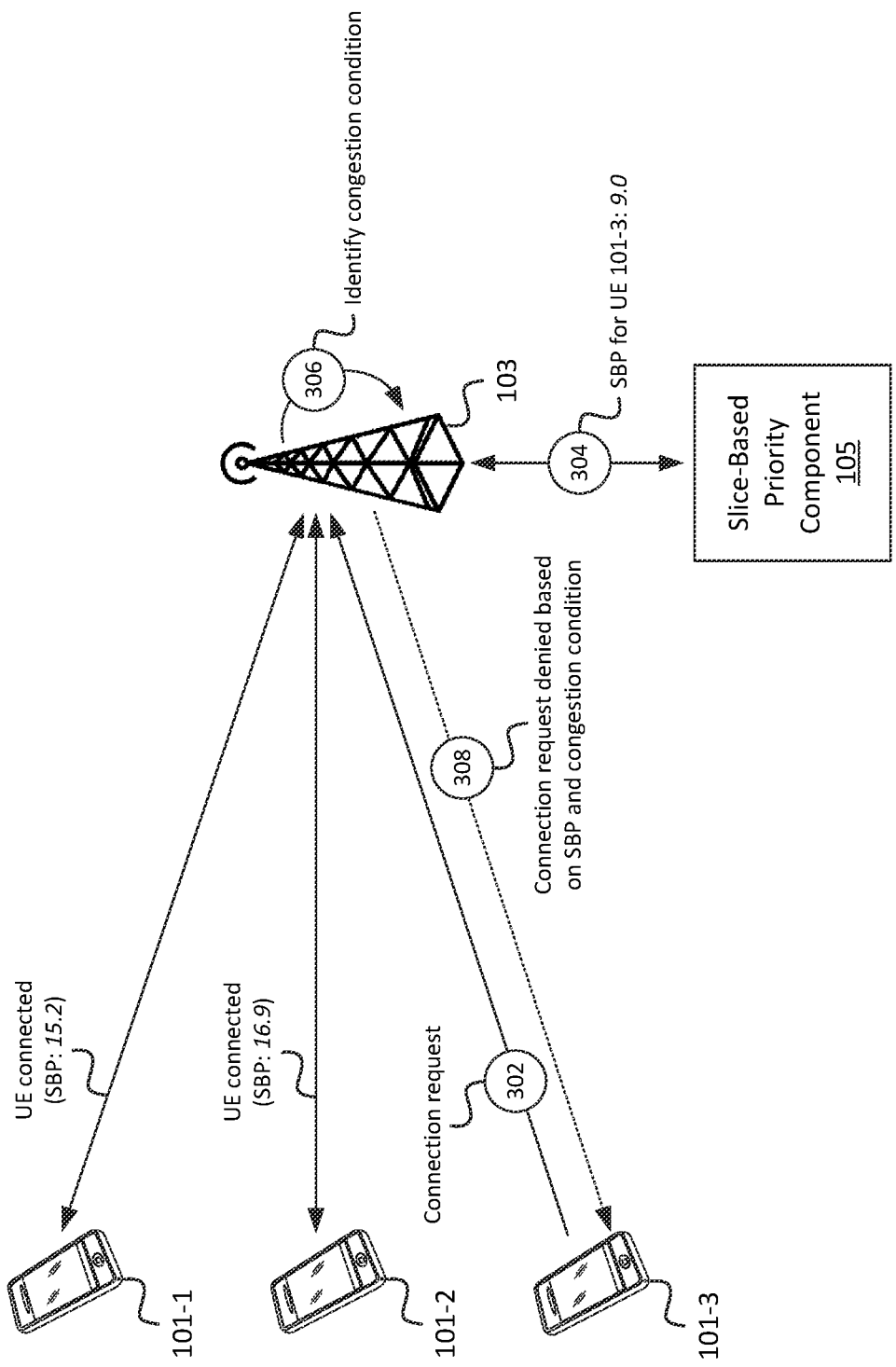
FIG. 3 illustrates an example of a base station denying a connection request for a UE based on identifying a RAN congestion condition and further based on determining that an SBP value of the UE is lower than SBP values of connected UEs.

FIG. 3 illustrates an example of base station 103 denying a connection request for a particular UE 101 based on identifying a RAN congestion condition and further based on determining that an SBP value of UE 101 is lower than SBP values of connected UEs 101. For example, as shown, UE 101-1 may be connected to base station 103, and an example SBP value of 15.2 may have been determined for UE 101-1. As further shown, UE 101-2 may be connected to base station 103 with an SBP value of 16.9. Base station 103 may receive (at 302) a connection request from UE 101-3, and may obtain (at 304) an SBP value for UE 101-3 in a manner similar to that described above. For example, base station 103 may provide parameters associated with UE 101-3 and/or a requested service type to SBP component 105, SBP component 105 may calculate, determine, etc. an SBP value of 9.0 based on the received information, and may provide the SBP value to base station 103.

In this example, further assume that base station 103 has identified (at 306) a congestion condition. For example, base station 103 may have determined that a quantity of connected UEs exceeds a threshold quantity, that an amount of available RF resources (e.g., PRBs) associated with base station 103 is below a threshold amount of RF resources, may detect a congestion condition that prevents the connection of additional UEs 101 to base station 103, and/or may otherwise determine that new connections to base station 103 should be limited.

Accordingly, base station 103 may deny (at 308) the connection request from UE 101-3. For example, based on identifying (at 306) the congestion condition, base station 103 may evaluate incoming connection requests based on SBP values, and may deny connection requests for UEs 101 or QoS flows that are associated with lower SBP values than UEs 101 that are currently connected to base station 103 and/or QoS flows that are already established via base station 103. In this example, as the SBP value for UE 101-3 is 9.0 (i.e., lower than the SBP values of 15.2 and 16.9 for UEs 101-1 and 101-2, respectively), base station 103 may deny (at 308) the connection request from UE 101-3.

Figure 4:
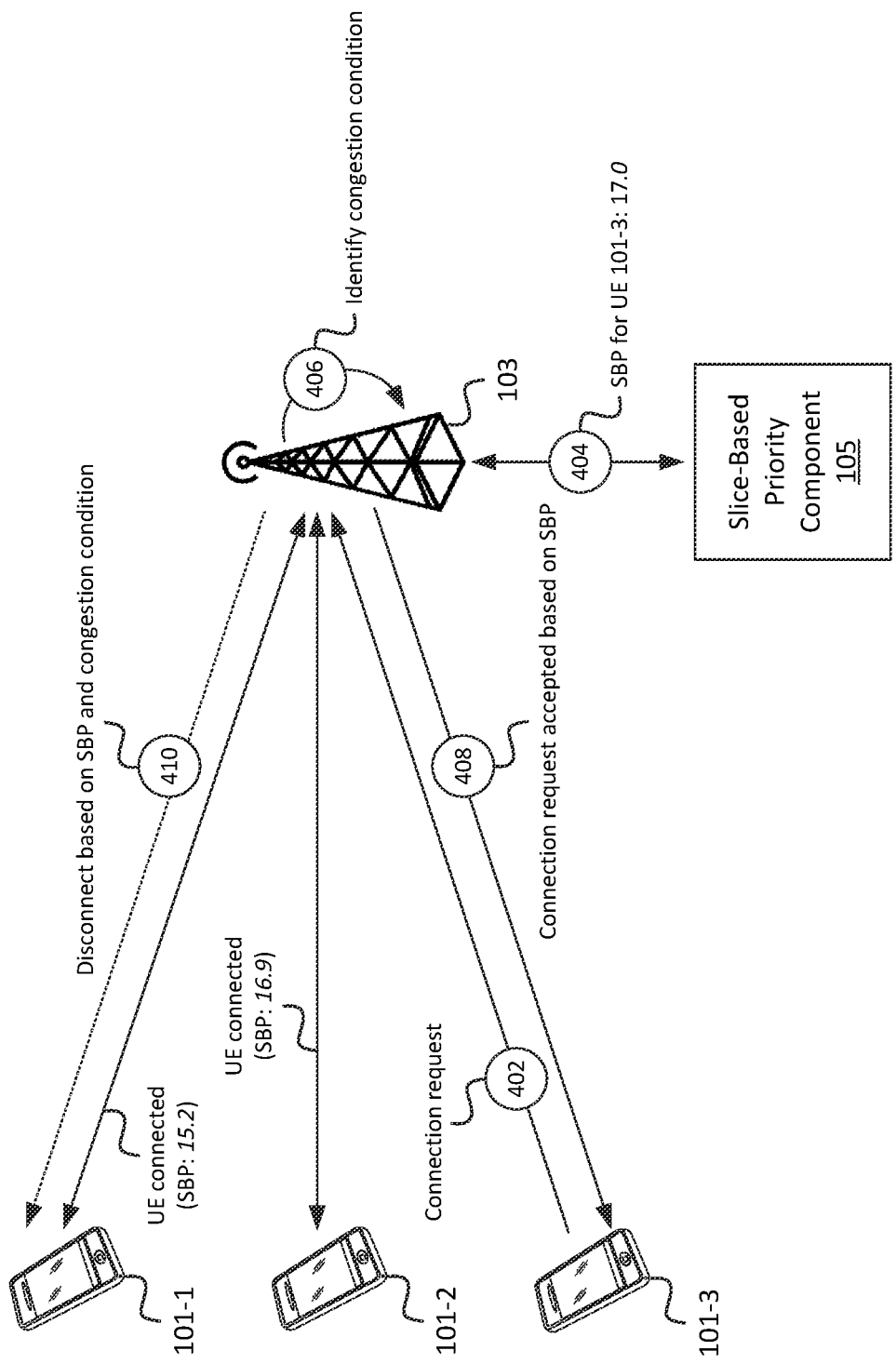
FIG. 4 illustrates an example of a base station disconnecting a UE with an existing connection based on identifying a RAN congestion condition and further based on determining that an SBP value of the UE is lower than SBP values of a UE for which an incoming connection request has been received.

As another example, as shown in FIG. 4, base station 103 may receive (at 402) a connection request from UE 101-3, and may obtain (at 404) a SBP value of 17.0 for UE 101-3. As similarly discussed above, base station 103 may also identify (at 406) a congestion condition in this example. As the SBP value for UE 101-3 (i.e., 17.0) is higher than the SBP value of at least one of the connected UEs 101, base station 103 may accept (at 408) the connection request from UE 101-3. Specifically, as shown, the SBP value of 17.0, for UE 101-3, is higher than the example SBP value of 15.2 for UE 101-1.

Since UE 101-1 is associated with the lowest of the SBP values of UEs 101 connected to base station 103 in this example, base station 103 may disconnect (at 410) UE 101-1, and/or may cease allocating resources (e.g., PRBs) to traffic associated with UE 101-1. Additionally, or alternatively, base station 103 may tear down one or more QoS flows associated with UE 101 (e.g., one or more QoS flows associated with the SBP value of 15.2). For example, in situations where UE 101-1 is associated with multiple QoS flows (e.g., QoS flows associated with multiple service types, such as a first QoS flow for voice call traffic and a second QoS flow for data traffic) having different SBP values, base station 103 may tear down the first QoS flow associated with UE 101-1 (e.g., a QoS flow selected based on being associated with a lower or lowest SBP value) without tearing down the second QoS flow associated with UE 101.

In the manner described above with respect to the example situations shown in FIGS. 3 and 4, base station 103 may use SBP values to perform preemption on existing connections and/or QoS flows, and/or to determine whether to accept new connections or requests to establish new QoS flows. As SBP values may be determined based on network slice (e.g., NSSAI) and/or other QoS-related parameters, the use of SBP values to perform such preemption may provide a closer end-to-end QoS experience than relying on RAN-level parameters alone, such as ARP. Further, as noted above, the techniques for determining SBP values may be refined on an ongoing basis, thus providing an enhanced level of dynamism and granularity as compared to relying on ARP alone.

Figure 5:
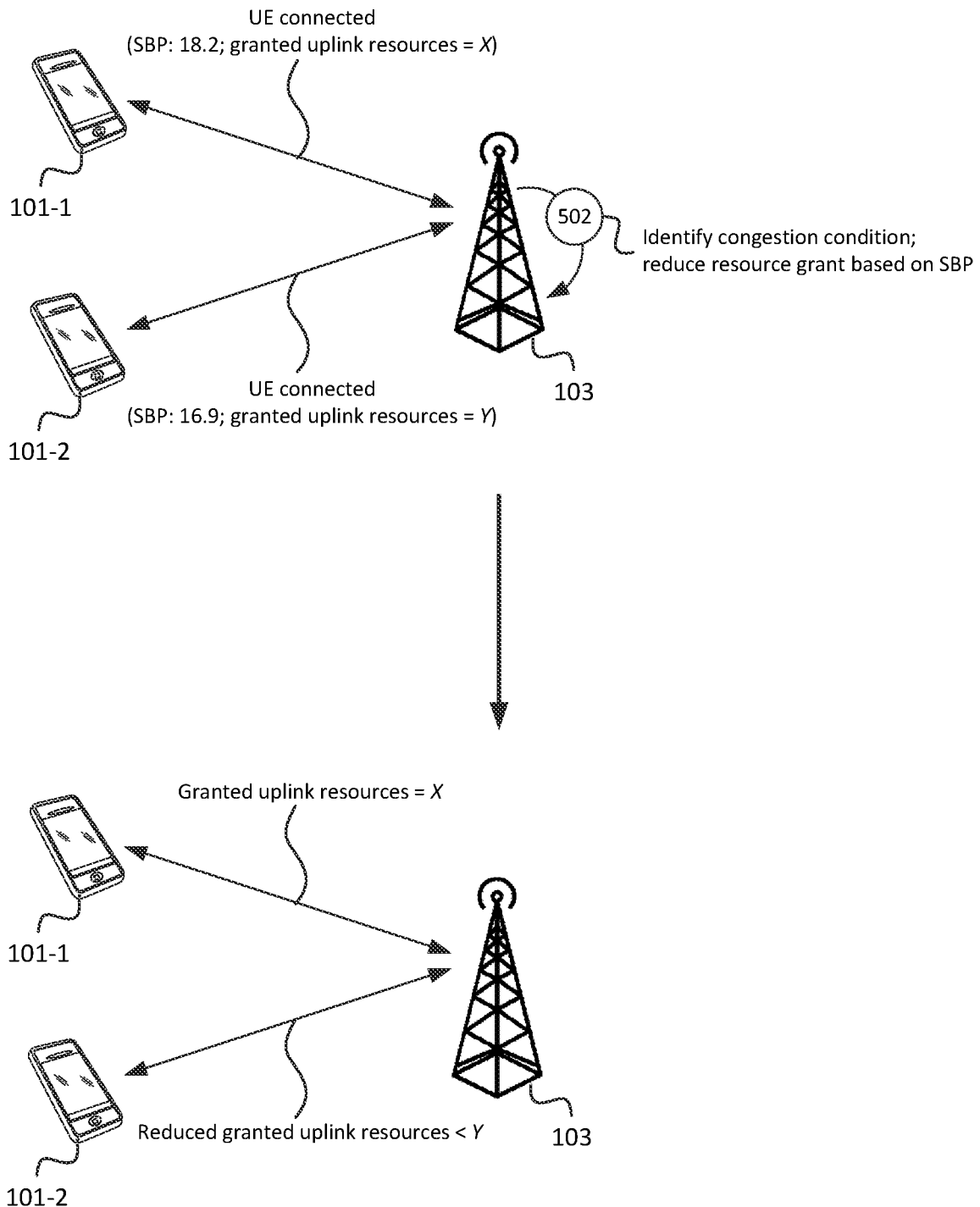
FIG. 5 illustrates an example of resource modification associated with a UE based on based on identifying a RAN congestion condition and further based on determining an SBP value of the UE is lower than SBP values of one or more other connected UEs.

FIG. 5 illustrates an example of resource modification associated with a given UE 101 based on based on identifying a RAN congestion condition and further based on determining an SBP value of the given UE 101 is lower than SBP values of one or more other connected UEs 101. For example, as shown, UEs 101-1 and 101-2 may be connected to base station 103. Base station 103 may allocate, or grant, a set of RF resources (e.g., PRBs) that may be used by UEs 101-1 and 101-2 for uplink traffic (e.g., traffic sent to base station 103 from UEs 101-1 and 101-2). In this example, the amount of allocated resources (e.g., PRBs) granted by base station 103 to UE 101-1 for uplink traffic is denoted as X resources, and the amount of allocated resources granted to UE 101-2 for uplink traffic is denoted as Y resources. While different values (e.g., X and Y) are used in this example, in practice, UE 101-1 and UE 101-2 may be granted the same amount of resources for uplink traffic.

As further shown, base station 103 may identify (at 502) a congestion condition, which may include a determination that a quantity of available resources associated with base station 103 has fallen below a threshold, a quantity of UEs 101 connected to base station 103 exceeds a threshold, a condition based on which base station 103 may determine that additional resources are needed, and/or some other condition based on which base station 103 may determine that resources allocated to one or more UEs 101 should be reduced.

In this example, base station 103 may determine that such resources should be removed from the resources granted to UE 101-2. For example, in accordance with some embodiments, base station 103 make such a determination on the basis of SBP values associated with UEs 101 connected to base station 103 (e.g., UEs 101-1 and 101-2, in this example). As shown, since UE 101-2 has a lower SBP value than UE 101-1 (e.g., 16.9 as compared to 18.2) base station 103 may reduce a granted amount of resources to UE 101-2 from Y to a value less than Y (denoted in the figure as "<Y").

Figure 6A:
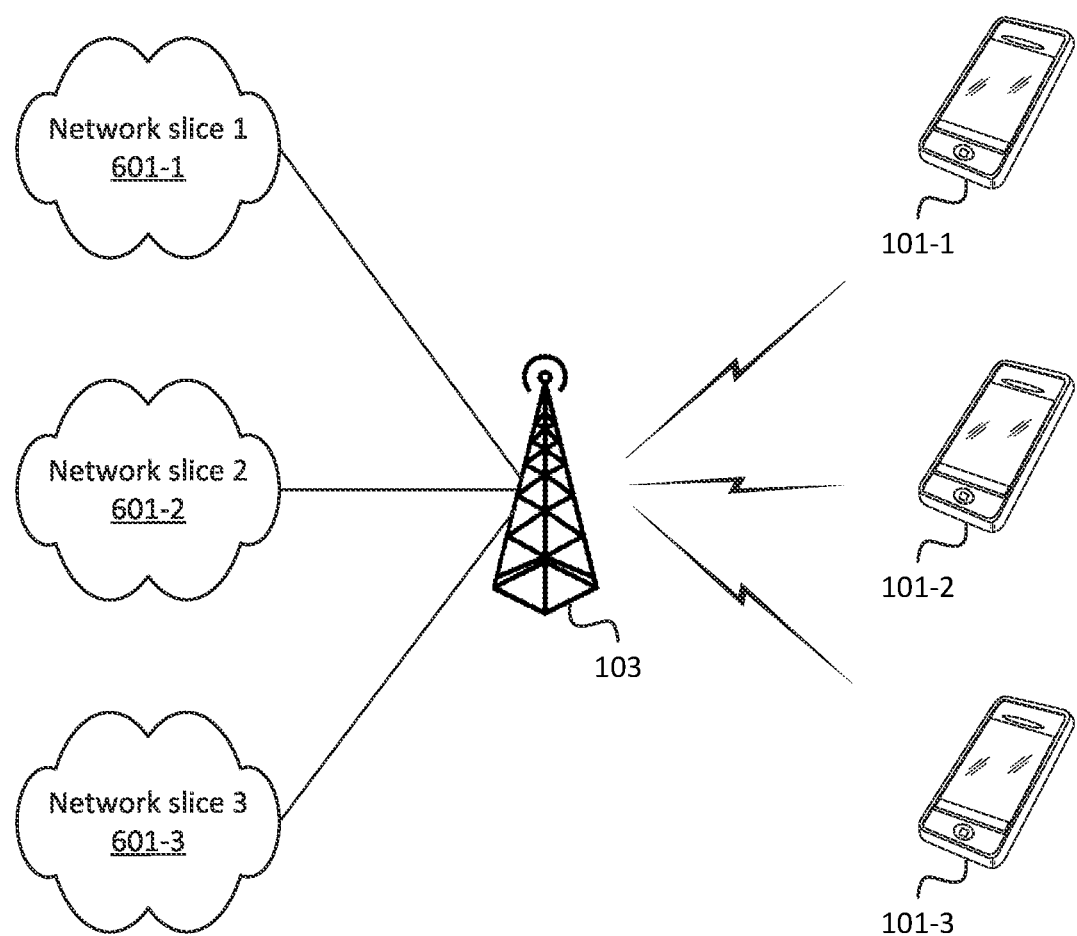
FIG. 6A illustrates an example of a base station of a RAN communicatively coupled to multiple network slices and to multiple UEs.

FIG. 6A illustrates an example of base station 103 communicatively coupled to multiple network slices 601 and to multiple UEs 101. For example, base station 103 may provide a wireless interface for traffic to and/or from UEs 101-1, 101-2, and 101-3. Base station 103 may, for example, provide uplink traffic received from UEs 101 to a given network slice 601 (e.g., a particular network slice associated with a QoS flow with which the traffic is associated). Base station 103 may further provide downlink traffic received from a particular network slice 601 to a particular UE 101 to which the traffic is destined. As noted above, each network slice 601 may include a partial or complete instance of a core network, which may serve as an interface between UEs 101 and one or more external networks (e.g., the Internet).

Figure 6B:
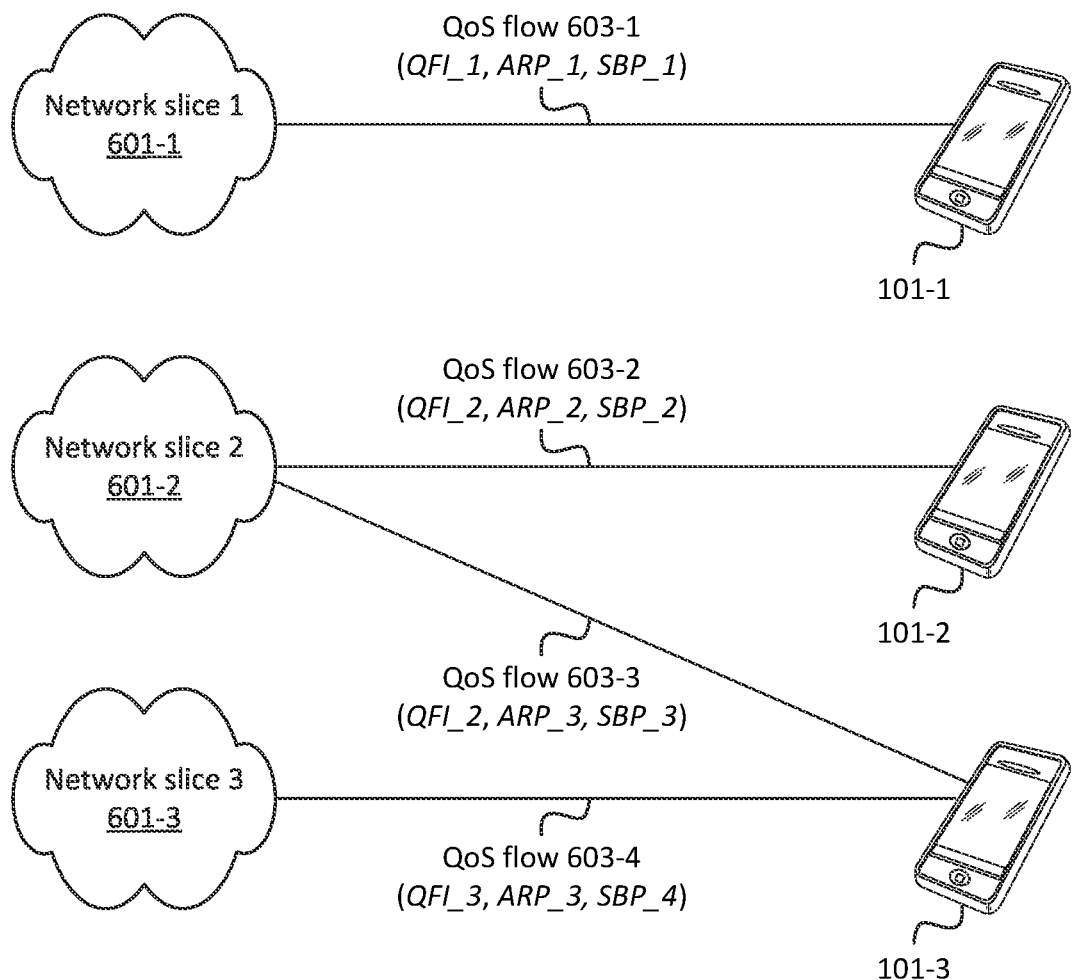
FIG. 6B illustrates example QoS flows that may be associated with different network slices and UEs, as well as corresponding SBP values for such QoS flows.

As shown in FIG. 6B, UEs 101 may be associated with one or more QoS flows 603, which may be associated with a particular network slice 601. In this manner, a given network slice 601 may communicate with multiple UEs 101 (e.g., via base station 103), a given UE 101 may communicate with a single network slice 601, and/or a given UE 101 may communicate with multiple network slices 601. For example, as shown, QoS flow 603-1 may be associated with UE 101-1 and with network slice 601-1. Thus, traffic sent to and/or from UE 101-1 may be sent to and/or from network slice 601-1, via QoS flow 603-1. As further shown, QoS flow 603-1 may be associated with a first QFI value (shown as "QFI_1"). In some scenarios, network slice 601-1 may have been selected to serve QoS flow 603-1 based on the QFI value (e.g., base station 103 or some other device or system may identify the QFI based on an identifier of UE 101-1, a type of service requested by UE 101-1, and/or one or more other factors).

Additionally, or alternatively, network slice 601-1 may have been selected to serve QoS flow 603-1 based on Internet Protocol ("IP") information associated with particular traffic sent by or received from UE 101-1 via QoS flow 603-1. For example, UE 101-1 may send traffic to a particular IP address, such as an IP address of an application server associated with a particular web-based service (e.g., an augmented reality/virtual reality ("AR/VR") service) or content (e.g., streaming content). Base station 103 and/or some other component may determine that the web-based service or content (e.g., the AR/VR service) is associated with particular network slice 601-1. For example, base station 103 may determine, based on IP information (e.g., information included in an IP header of traffic, such as a source or a destination IP address) that particular traffic and/or a particular QoS flow 603-1 is associated with particular network slice 601-1. For example, network slice 601-1 may be selected from the set of network slices that includes network slices 601-1 through 601-3 based on a mapping or other suitable information that corresponds the particular IP information to particular network slice 601-1. In some embodiments, network slice 601 may be selected based on other information in addition to, or in lieu of, IP information associated with traffic sent to or from UE 101-1.

Further, QoS flow 603-1 may be associated with a particular ARP value (shown as "ARP_1"), which may be selected by base station 103 or some other device or system based on an identifier of UE 101-1, a type of service requested (e.g., data service, voice service, emergency call service, etc.), or other information. For example, the ARP may be selected based on parameters included in registration messages, such as Non-Access Stratum ("NAS") messages communicated between UE 101-1, base station 103, and/or one or more other devices or systems (e.g., an AMF communicatively coupled to base station 103 and/or some other device or system that performs or facilitates registration of UE 101-1 with base station 103).

In some embodiments, the identification or selection of the ARP value may be independent of the QFI value and/or selected network slice 601. In some situations, different ARP values (e.g., associated with different QoS flows 603 for the same UE 101, and/or associated with different UEs 101) may correspond to QoS flows 603 that are associated with the same network slice 601. In some situations, the same ARP value may correspond to QoS flows 603 that are associated with different network slices 601. Further, in some situations, different ARP values may correspond to QoS flows 603 that are associated with different network slices 601.

As similarly noted above, QoS flow 603-1 may further be associated with a particular SBP value (shown as "SBP_1"). The SBP value may have been determined (e.g., by SBP component 105, as discussed above) based on a slice identifier of network slice 601-1 (e.g., NSSAI), the ARP value associated with UE 101, a geographic location of UE 101, a TAI associated with UE 101 and/or base station 103, a PLMN ID associated with UE 101 and/or base station 103, and/or one or more other factors. As further noted above, the SBP value may have been generated or refined using machine learning, AI, and/or some other suitable technique.

As further shown in FIG. 6B, UE 101-2 may be associated with QoS flow 603-2, which may be associated with network slice 601-2. QoS flow 603-2 may further be associated with a QFI value of "QFI_2," an ARP value of "ARP_2," and an SBP value of "SBP_2" (e.g., where the SBP value was determined or calculated based on the ARP value, the SBP value, and/or some other suitable factor associated with UE 101-2 and/or base station 103).

As additionally shown, UE 101-3 may be associated with two QoS flows 603-3 and 603-4. QoS flows 603-3 and 603-4 may be concurrently active. For example, the two different QoS flows 603-3 and 603-4 may be associated with different QFI values, different service types, and/or some other differentiating factor. Thus, while QoS flows 603-3 and 603-4 are both associated with the same UE 101-3, such QoS flows 603-3 and 603-4 may have differing SBP values (e.g., "SBP_3" for QoS flow 603-3 and "SBP_4" for QoS flow 603-4). As noted above, traffic associated with the different QoS flows 603-3 and 603-4 for UE 101-3 may be treated differently in certain situations, such as when base station 103 has detected a congestion condition. For example, in some situations, base station 103 may tear down QoS flow 603-3 while leaving QoS flow 603-4 active, may reduce a downlink bitrate of traffic associated with QoS flow 603-3 without reducing the bitrate of traffic associated with QoS flow 603-4 (and/or may reduce a bitrate of QoS flow 603-4 by a lesser amount or proportion), may reduce an amount of granted uplink resources associated with QoS flow 603-3 without reducing the granted uplink resources associated with QoS flow 603-4 (and/or may reduce the granted uplink resources associated with QoS flow 603-4 by a lesser amount or proportion), and/or may otherwise differentially treat QoS flows 603-3 and 603-4.

Figure 7:
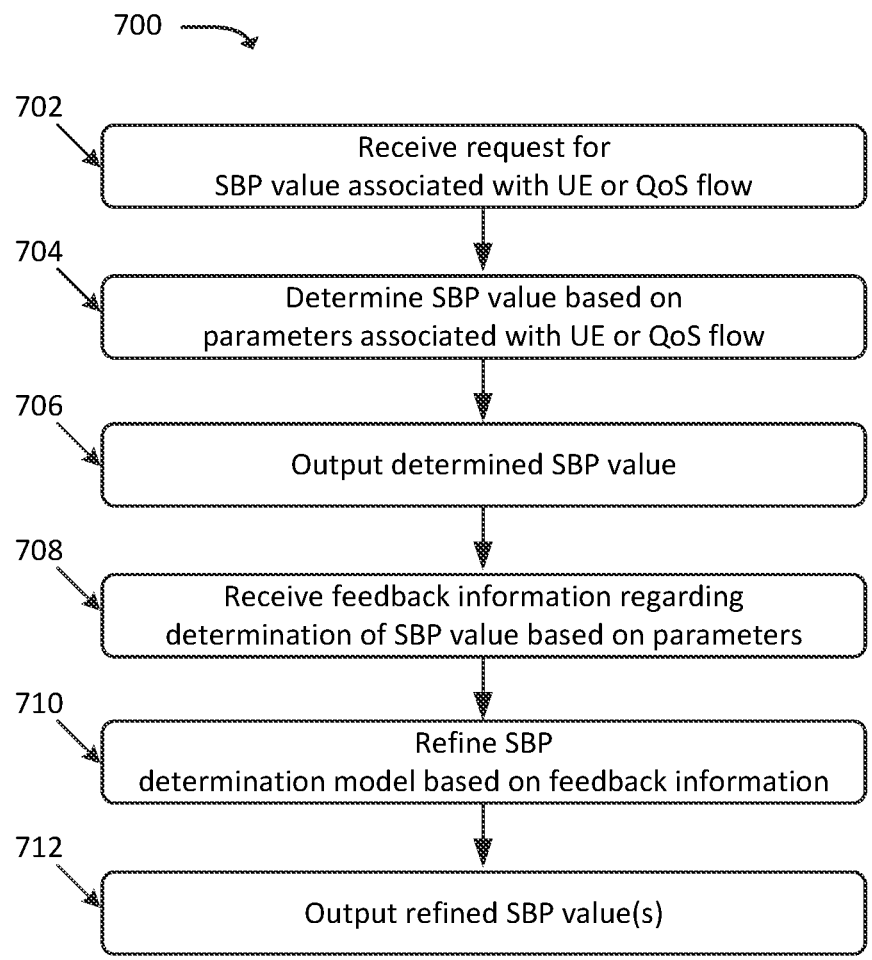
FIG. 7 illustrates an example process for determining and refining SBP values for a given UE and/or QoS flow in accordance with some embodiments.

FIG. 7 illustrates an example process 700 for determining and refining SBP values for a given UE 101 and/or QoS flow 603. In some embodiments, some or all of process 700 may be performed by SBP component 105. In some embodiments, one or more other devices may perform some or all of process 700 in concert with, and/or in lieu of, SBP component 105 (e.g., base station 103).

As shown, process 700 may include receiving (at 702) a request for a SBP value associated with a given UE 101 and/or QoS flow 603. For example, SBP component 105 may receive such a request from base station 103 based on UE 101 requesting a connection to base station 103 and/or the establishment of one or more QoS flows 603 (e.g., based on one or more service or Packet Data Network ("PDN") requests from UE 101). The request may include parameters associated with UE 101, base station 103, QoS flow 603, and/or network slice 601. For example, the request may include one or more QFI values associated with UE 101 and/or a requested service type, one or more ARP values associated with UE 101, a NSSAI or other identifier of network slice 601, a geographic location or TAI associated with UE 101 and/or base station 103, a PLMN ID associated with UE 101 and/or base station 103, and/or one or more other parameters or values.

Process 700 may further include determining (at 704) a particular SBP value based on the received parameters associated with UE 101 and/or QoS flow 603. For example, SBP component 105 may maintain one or more models correlating particular parameters or sets of parameters to particular SBP values. Additionally, or alternatively, SBP component 105 may perform a suitable function to calculate the SBP value, where some or all of the received parameters are inputs to the function.

Process 700 may additionally include outputting (at 706) the SBP value. For example, SBP component 105 may output, to base station 103, the determined, identified, calculated, etc. SBP value. As discussed above, base station 103 may accordingly use the SBP value for resource allocation and/or preemption of UEs 101 and/or QoS flows 603.

Process 700 may also include receiving (at 708) feedback information regarding the determination or calculation of the SBP value based on the parameters (received with the request at 702). For example, as discussed above, SBP component 105 may receive (e.g., from base station 103, UE 101, and/or some other device or system) RAN-based feedback information such as utilization of resources associated with base station 103 (e.g., which may indicate resources that were allocated by base station 103 and were either used or unused for traffic), availability of resources associated with base station 103 (e.g., resources of base station 103 which were available for allocation), load or congestion information associated with base station 103, and/or other RAN-based metrics. In some embodiments, SBP component 105 may receive performance-based information, such as latency, jitter, packet loss, packet error rate, throughput, and/or other suitable information associated with performance-based metrics exhibited or experienced by UE 101. Such RAN-based metrics and/or performance-based metrics associated with UE 101 and/or base station 103 may result from, and/or may otherwise be correlated with, the determined SBP values.

Process 700 may further include refining (at 710) a SBP determination model based on the feedback information. For example, as discussed above, SBP component 105 may use machine learning, AI, and/or other suitable techniques to refine the calculation or determination of SBP values based on particular parameters or sets of parameters, in order to increase the likelihood that feedback received in response to the determination of SBP values meets one or more thresholds and/or advances one or more QoS-based objectives (e.g., reducing latency, improving throughput, improving RAN resource utilization, reducing RAN resource load, etc.). As noted above, the refinement (at 710) of the determination or calculation of SBP values may be performed iteratively using machine learning and/or some other suitable process, in order to continually increase the likelihood that feedback based on SBP values meets the thresholds and/or advances the QoS-based objectives.

Process 700 may additionally include outputting (at 712) refined SBP values. For example, in situations where, based on the received feedback, SBP component 105 determines a different SBP value for the received (at 702) set of parameters, SBP component 105 may output the refined SBP values to base station 103. In this manner, base station 103 may be kept up-to-date regarding the updated SBP values, and may treat UEs 101 and/or associated QoS flows 603 in accordance with the updated SBP values.

Figure 8:
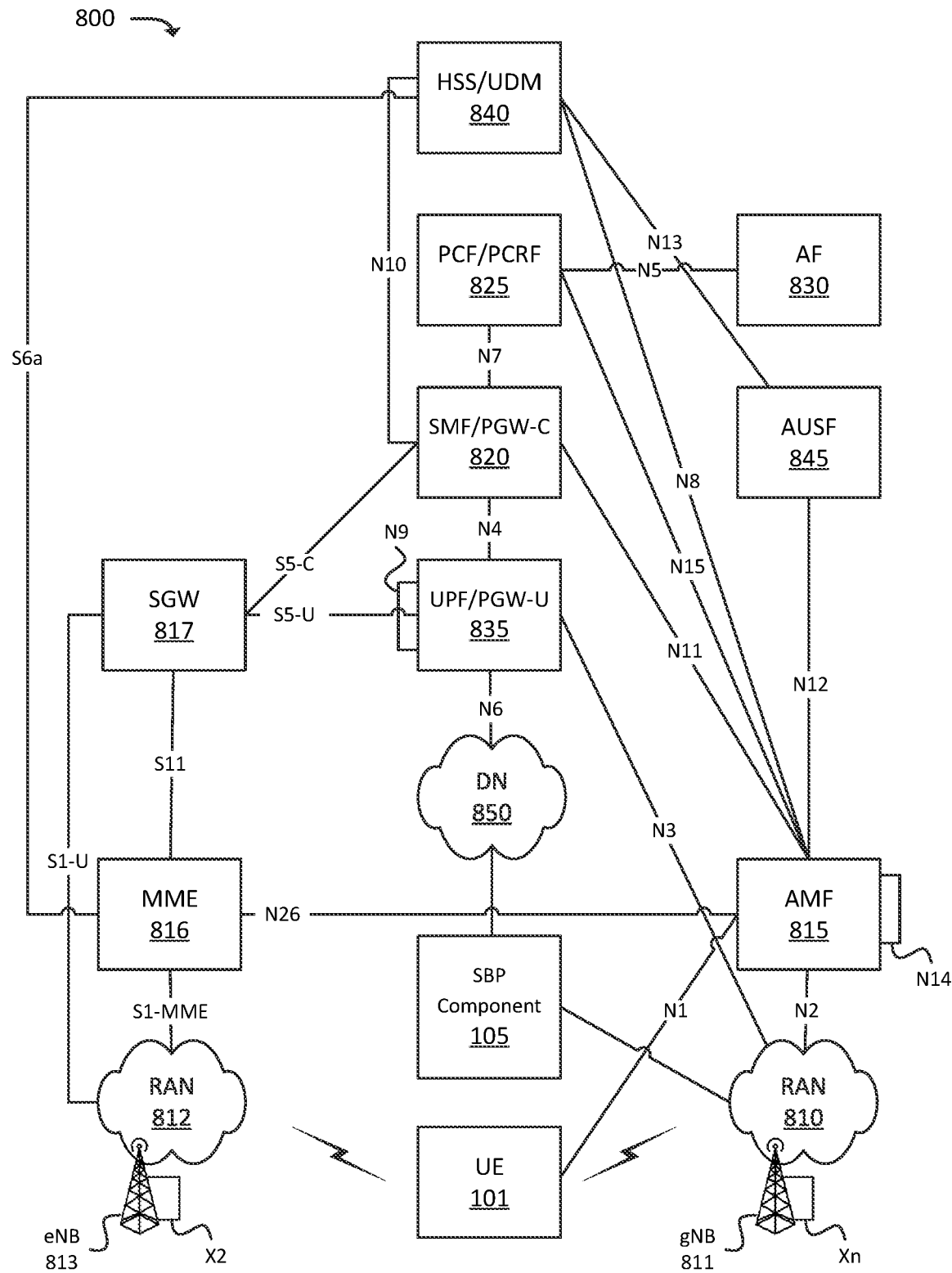
FIG. 8 illustrates an example environment in which one or more embodiments, described herein, may be implemented.

FIG. 8 illustrates an example environment 800, in which one or more embodiments may be implemented. In some embodiments, environment 800 may correspond to a 5G network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 101, RAN 810 (which may include one or more gNBs 811), RAN 812 (which may include one or more evolved Node Bs ("eNBs") 813), and various network functions such as AMF 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, Authentication Server Function ("AUSF") 845, and SBP component 105. Environment 800 may also include one or more networks, such as Data Network ("DN") 850.

The example shown in FIG. 8 illustrates one example of each network component or function (e.g., one instance of SMF/PGW-C 820, PCF/PCRF 825, UPF/PGW-U 835, HSS/UDM 840, and/or 845. In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or 845, while another slice may include a second instance of SMF/PGW-C 820, PCF/PCRF 825, UPF/PGW-U 835, HSS/UDM 840, and/or 845). The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 101 may include a computation and communication device, such as a wireless mobile communication device that is capable of communicating with RAN 810, RAN 812, and/or DN 850. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 101 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 811), via which UE 101 may communicate with one or more other elements of environment 800. UE 101 may communicate with RAN 810 via an air interface (e.g., as provided by gNB 811). For instance, RAN 810 may receive traffic (e.g., voice call traffic, data traffic, messaging traffic, signaling traffic, etc.) from UE 101 via the air interface, and may communicate the traffic to UPF/PGW-U 835, and/or one or more other devices or networks. Similarly, RAN 810 may receive traffic intended for UE 101 (e.g., from UPF/PGW-U 835, AMF 815, and/or one or more other devices or networks) and may communicate the traffic to UE 101 via the air interface. In some embodiments, gNB 811 may include, may implement, and/or may be an instance of base station 103.

RAN 812 may be, or may include, a LTE RAN that includes one or more base stations (e.g., one or more eNBs 813), via which UE 101 may communicate with one or more other elements of environment 800. UE 101 may communicate with RAN 812 via an air interface (e.g., as provided by eNB 813). For instance, RAN 810 may receive traffic (e.g., voice call traffic, data traffic, messaging traffic, signaling traffic, etc.) from UE 101 via the air interface, and may communicate the traffic to UPF/PGW-U 835, and/or one or more other devices or networks. Similarly, RAN 810 may receive traffic intended for UE 101 (e.g., from UPF/PGW-U 835, SGW 817, and/or one or more other devices or networks) and may communicate the traffic to UE 101 via the air interface.

AMF 815 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 101. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 101, from DN 850, and may forward the user plane data toward UE 101 (e.g., via RAN 810, SMF/PGW-C 820, and/or one or more other devices). In some embodiments, multiple UPFs 835 may be deployed (e.g., in different geographical locations), and the delivery of content to UE 101 may be coordinated via the N9 interface (e.g., as denoted in FIG. 8 by the line marked "N9" originating and terminating at UPF/PGW-U 835). Similarly, UPF/PGW-U 835 may receive traffic from UE 101 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 101.

SBP component 105 may include one or more devices, systems, VNFs, etc., that perform one or more operations described above. For example, SBP component 105 may determine, calculate, and/or otherwise provide SBP values to elements of RAN 810 (e.g., gNB 811), based on which such elements may prioritize, preempt, and/or allocate resources for UE 101. Further, as noted above, SBP component 105 may use machine learning or other suitable techniques to refine one or more mappings, models, functions, etc. based on which SBP values are determined for UEs 101 and/or QoS flows 603 associated with UEs 101.

DN 850 may include one or more wired and/or wireless networks. For example, DN 850 may include an IP-based PDN, a wide area network ("WAN") such as the Internet, a private enterprise network, and/or one or more other networks. UE 101 may communicate, through DN 850, with data servers, other UEs 101, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 101 may communicate.

Figure 9:
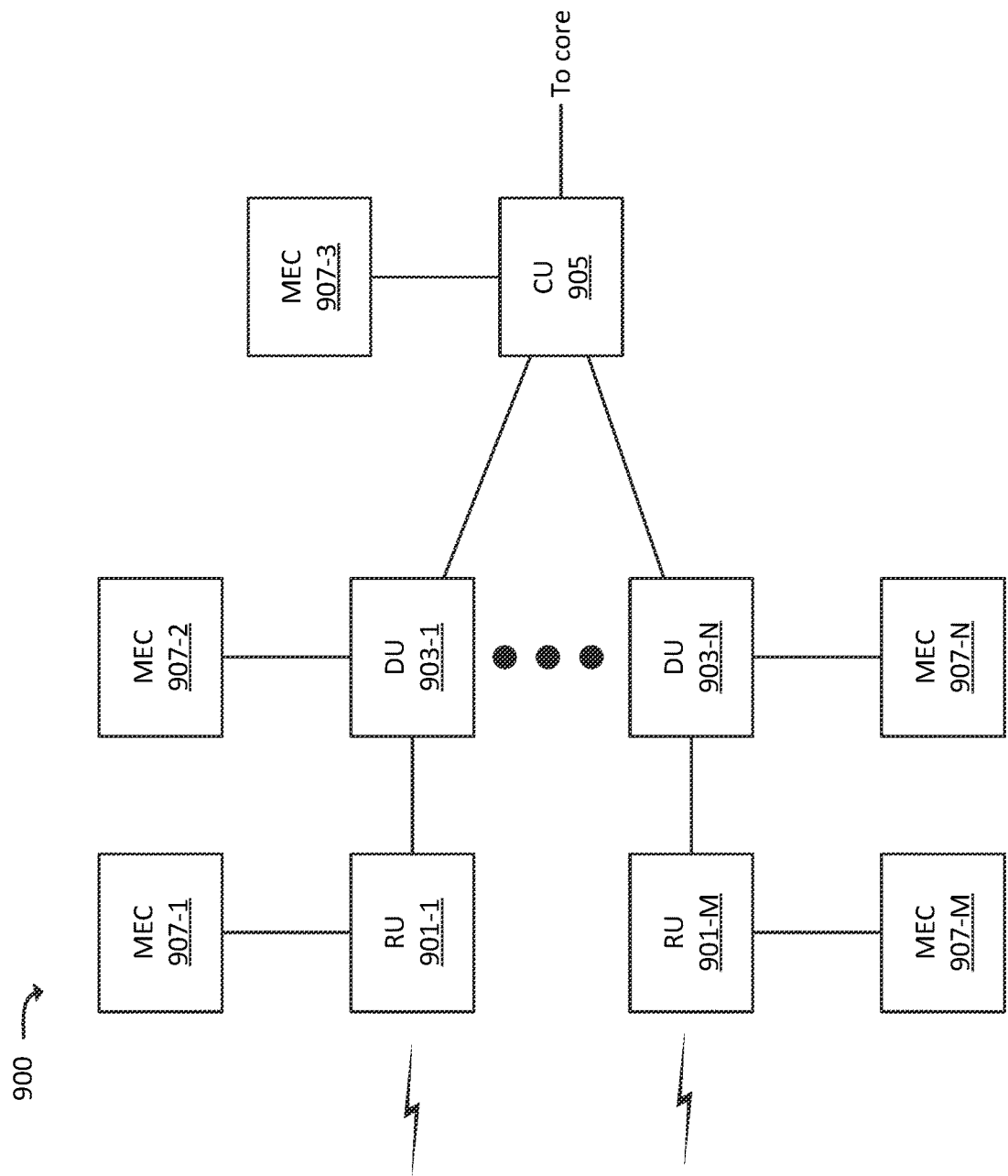
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 101 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 101, and may determine which DU(s) 903 should receive the downlink traffic. DU 903 may include one or more devices that transmit traffic between a core network (e.g., via CU 905) and UE 101 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 101.

RU 901 may include hardware circuitry (e.g., one or more RF transceivers, antennas, radios, and/or other suitable hardware) to communicate wirelessly (e.g., via an RF interface) with one or more UEs 101, one or more other DUs 903 (e.g., via RUs 901 associated with DUs 903), and/or any other suitable type of device. In the uplink direction, RU 901 may receive traffic from UE 101 and/or another DU 903 via the RF interface and may provide the traffic to DU 903. In the downlink direction, RU 901 may receive traffic from DU 903, and may provide the traffic to UE 101 and/or another DU 903.

RUs 901 may, in some embodiments, be communicatively coupled to one or more Multi-Access/Mobile Edge Computing ("MEC") devices, referred to sometimes herein simply as ("MECs") 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 101, via a respective RU 901.

For example, RU 901-1 may route some traffic, from UE 101, to MEC 907-1 instead of to a core network (e.g., via DU 903 and CU 905). MEC 907-1 may process the traffic, perform one or more computations based on the received traffic, and may provide traffic to UE 101 via RU 901-1. In this manner, ultra-low latency services may be provided to UE 101, as traffic does not need to traverse DU 903, CU 905, and an intervening backhaul network between DU network 900 and the core network. In some embodiments, MEC 907 may include, and/or may implement some or all of the functionality described above with respect to SBP component 105.

Figure 10:
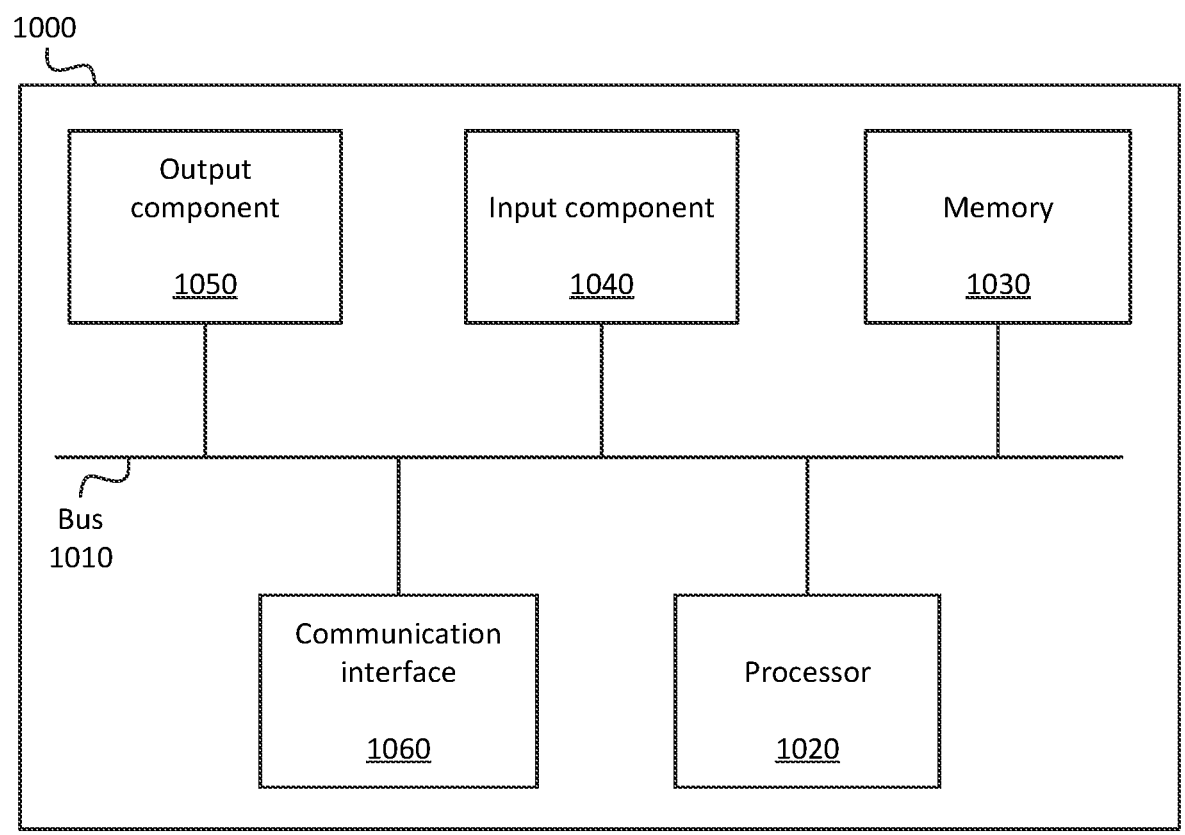
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain one or more models that associate User Equipment ("UE") attributes to respective priority values, wherein the one or more models are based on at least one of:
an association between respective priority values and resource utilization metrics associated with one or more base stations of a radio access network ("RAN"), or
an association between respective priority values and performance metrics associated one or more UEs;
identify one or more attributes of a particular UE, wherein the UE attributes include a network slice associated with the connection between the particular base station and the UE;
determine a priority value based on the one or more attributes of the UE and further based on the one or more models; and
output the priority value to a particular base station associated with the RAN, wherein the particular base station uses the priority value to determine an allocation of resources of the particular base station for a connection between the particular base station and the UE.

2. The device of claim 1, wherein the connection includes one or more Quality of Service ("QoS") flows between the base station and the UE.

3. The device of claim 2, wherein the one or more QoS flows include a first QoS flow and a second QoS flow between the base station and the UE, wherein the priority value is a first priority value, wherein the allocation of resources of the particular base station is a first allocation of resources, wherein the one or more processors are further configured to:
determine a second priority value for the second QoS flow; and
output the second priority value to the base station, wherein the base station uses the second priority value to determine a second allocation of resources of the base station for the second QoS flow.

4. The device of claim 1, wherein the one or more processors are further configured to:
receive an Allocation and Retention Priority ("ARP") value associated with the UE, wherein the priority value is determined further based on the ARP value.

5. The device of claim 1, wherein determining the priority value is further based on at least one of:
a geographical location of the UE,
a geographical location of the particular base station,
a tracking area in which the UE is located, or
a tracking area in which the particular base station is located.

6. The device of claim 1, wherein determining the priority value and outputting the priority value are based on a request from the UE to connect to the particular base station.

7. A non-transitory computer-readable medium, storing a plurality of processor-executable instructions to:
maintain one or more models that associate User Equipment ("UE") attributes to respective priority values, wherein the one or more models are based on at least one of:
an association between respective priority values and resource utilization metrics associated with one or more base stations of a radio access network ("RAN"), or
an association between respective priority values and performance metrics associated one or more UEs;
identify one or more attributes of a particular UE, wherein the UE attributes include a network slice associated with the connection between the particular base station and the UE;
determine a priority value based on the one or more attributes of the UE and further based on the one or more models; and
output the priority value to a particular base station associated with the RAN, wherein the particular base station uses the priority value to determine an allocation of resources of the particular base station for a connection between the particular base station and the UE.

8. The non-transitory computer-readable medium of claim 7, wherein the connection includes one or more Quality of Service ("QoS") flows between the base station and the UE.

9. The non-transitory computer-readable medium of claim 8, wherein the one or more QoS flows include a first QoS flow and a second QoS flow between the base station and the UE, wherein the priority value is a first priority value, wherein the allocation of resources of the particular base station is a first allocation of resources, wherein the plurality of processor-executable instructions further include processor-executable instructions to:
determine a second priority value for the second QoS flow; and
output the second priority value to the base station, wherein the base station uses the second priority value to determine a second allocation of resources of the base station for the second QoS flow.

10. The non-transitory computer-readable medium of claim 7, wherein the plurality of processor-executable instructions further include processor-executable instructions to:
receive an Allocation and Retention Priority ("ARP") value associated with the UE, wherein the priority value is determined further based on the ARP value.

11. The non-transitory computer-readable medium of claim 7, wherein determining the priority value is further based on at least one of:
a geographical location of the UE,
a geographical location of the particular base station,
a tracking area in which the UE is located, or
a tracking area in which the particular base station is located.

12. The non-transitory computer-readable medium of claim 7, wherein determining the priority value and outputting the priority value are based on a request from the UE to connect to the particular base station.

13. A method, comprising:
maintaining one or more models that associate User Equipment ("UE") attributes to respective priority values, wherein the one or more models are based on at least one of:
an association between respective priority values and resource utilization metrics associated with one or more base stations of a radio access network ("RAN"), or
an association between respective priority values and performance metrics associated one or more UEs;
identifying one or more attributes of a particular UE, wherein the UE attributes include a network slice associated with the connection between the particular base station and the UE;

determining a priority value based on the one or more attributes of the UE and further based on the one or more models; and outputting the priority value to a particular base station associated with the RAN, wherein the particular base station uses the priority value to determine an allocation of resources of the particular base station for a connection between the particular base station and the UE.

14. The method of claim 13, wherein the connection includes a first Quality of Service ("QoS") flow and a second QoS flow between the base station and the UE, wherein the priority value is a first priority value, wherein the allocation of resources of the particular base station is a first allocation of resources, the method further comprising:

determining a second priority value for the second QoS flow; and outputting the second priority value to the base station, wherein the base station uses the second priority value to determine a second allocation of resources of the base station for the second QoS flow.

15. The method of claim 13, further comprising:

receiving an Allocation and Retention Priority ("ARP") value associated with the UE, wherein the priority value is determined further based on the ARP value.

16. The method of claim 13, wherein determining the priority value is further based on at least one of:

a geographical location of the UE, a geographical location of the particular base station, a tracking area in which the UE is located, or a tracking area in which the particular base station is located.

17. The method of claim 13, wherein determining the priority value and outputting the priority value are based on a request from the UE to connect to the particular base station.

18. The method of claim 13, wherein the resource utilization metrics associated with a particular base station, of the one or more base stations of the RAN, are based on an amount or proportion of utilized Physical Resource Blocks ("PRBs") of the particular base station.

19. The device of claim 1, wherein the resource utilization metrics associated with a particular base station, of the one or more base stations of the RAN, are based on an amount or proportion of utilized Physical Resource Blocks ("PRBs") of the particular base station.

20. The non-transitory computer-readable medium of claim 7, wherein the resource utilization metrics associated with a particular base station, of the one or more base stations of the RAN, are based on an amount or proportion of utilized Physical Resource Blocks ("PRBs") of the particular base station.

* * * * *